United States Patent [19]
May

[11] Patent Number: 6,040,681
[45] Date of Patent: Mar. 21, 2000

[54] ENHANCED DOCKING TRAY SUPPORTS FOR CUSTOM FEATURING FOR EXTERNAL BATTERY CHARGING FOR NOTEBOOK COMPUTERS

[75] Inventor: Gregory J. May, Corvallis, Oreg.

[73] Assignee: Hewlett-Packard Company, Palo Alto, Calif.

[21] Appl. No.: 09/179,340

[22] Filed: Oct. 26, 1998

[51] Int. Cl.[7] .................................................. H02J 7/00
[52] U.S. Cl. ........................................ 320/113; 320/107
[58] Field of Search .................................. 320/110, 113; 361/683, 681, 686

[56] References Cited

U.S. PATENT DOCUMENTS

| | | | |
|---|---|---|---|
| 5,280,229 | 1/1994 | Faude et al. | 320/110 |
| 5,627,450 | 5/1997 | Ryan et al. | 361/686 |
| 5,694,292 | 12/1997 | Paulsel et al. | 361/686 |
| 5,699,226 | 12/1997 | Cavello | 361/686 |

*Primary Examiner*—Peter S. Wong
*Assistant Examiner*—Lawrence Luk

[57] ABSTRACT

A docking station is provided for coupling one of a set of differently configured portable computers to stationary peripheral devices, and for charging a respective battery pack for the portable computer. A battery receptacle is provided so that, while the user docks and uses the computer, he/she can insert the battery into the battery receptacle and charge the battery. This conveniently allows the user to charge up an extra battery pack while using the docked computer, even while a battery pack inside the computer is charging from AC power provided through the docking station to the computer. In a preferred embodiment, the docking station includes a standard module having all standard peripheral interfaces, AC power couplings, etc., and also includes a set of computer-specific second modules which accommodates the physical size and electrical characteristics of the different portable computers used. Each second module also has a battery receptacle compatible with the particular type of battery used by the corresponding portable computer. Accordingly, only the elements of the docking station which must vary from one model of computer and battery to another are embodied in the second module. Thus, design and manufacturing costs and inventory and administrative burdens are advantageously low for the manufacturer, and the user can easily upgrade to a new computer by getting only a new second module.

20 Claims, 5 Drawing Sheets

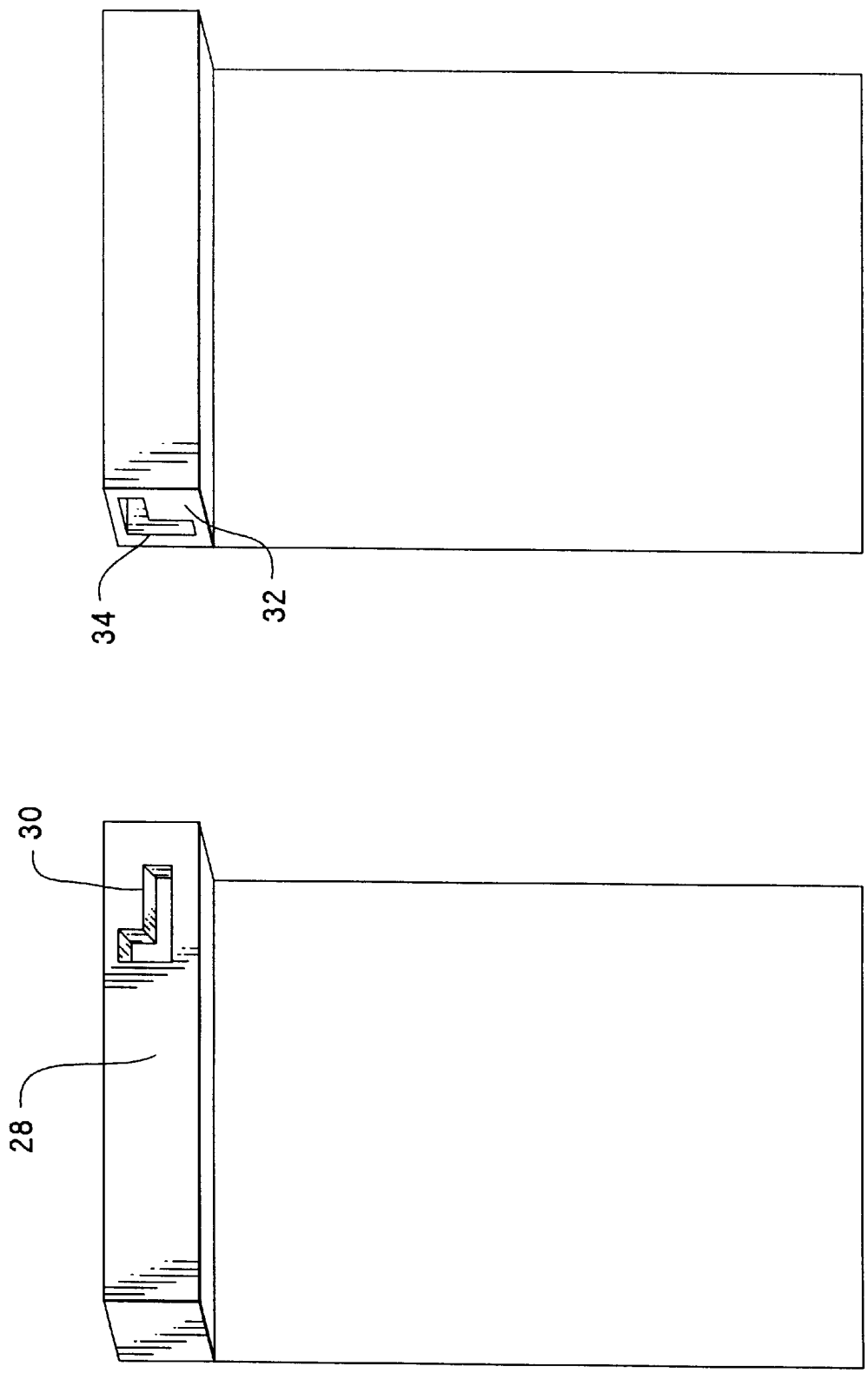

ENHANCED DOCKING TRAY SUPPORTS FOR CUSTOM FEATURING FOR EXTERNAL BATTERY CHARGING FOR NOTEBOOK COMPUTERS

FIELD OF THE INVENTION

The invention generally relates to the field of personal computers. More specifically, the invention relates to the use of portable computers which may be used in a stand-alone mode with battery power, or in a "desktop replacement" mode, coupled through a docking station to peripheral equipment.

BACKGROUND OF THE INVENTION

Portable computers, colloquially referred to as "laptop" or "notebook" computers, have increased in power, speed, and memory capacity to the point where they offer functionality comparable to that of desktop-style personal computers. However, because portable computers have been designed for small size and low weight, their keyboards and displays have been limited in size, making the portable computers less convenient to use.

Also, since portable computers are designed for stand-alone use, they obtain operational power from either rechargeable battery packs for full stand-alone use, or AC power for use conveniently close to power outlets. While a portable computer is in use on AC power, it takes advantage of the available AC power and recharges the battery pack. Alternatively, a battery pack can be removed from the portable computer and charged separately.

Accordingly, portable computers' features and accessories have been designed with suitable interfaces to allow a user to use the same large-size displays and full-size keyboards as would normally be used with a desktop machine. In particular, docking stations have been developed, to hold all of the electrical connections between the keyboard, display, network connection, etc., with the computer. Docking stations also are designed to plug into AC power, and to provide that power to the portable computer. Thus, all a user has to do is "dock" the portable computer with the docking station, and the computer is ready to directly interface with all of the peripherals.

It will be understood that there must be physical and electrical compatibility between the portable computer and its docking station. However, portable computers vary considerably in size, configuration, etc., even within a given manufacturer's line. Also, battery packs for different personal computers vary in physical size, charge holding capacity, chemical formulation (e.g., lithium, nickel-cadmium), and electrical recharge specifications such as current limit values.

Thus, conventionally it has been necessary for a portable computer manufacturer to provide either (i) a whole line of functionally identical but physically different docking stations and battery chargers, commensurate with its line of portable computers, (ii) a menagerie of adapters, or (iii) docking stations which are mechanically complex (and expensive) enough to accommodate all possible variations and permutations of portable computers and batteries. Further, it has been necessary for the manufacturer to upgrade or modify the docking stations and/or adapters when the manufacturer develops a new model, or new line, of portable computers.

This multiplicity of different configurations has disadvantageously required manufacturers to many different models, instead of a more cost-efficient, higher-volume single model compatible with many different portable computer models. Design and manufacturing costs, as well as inventory controls and administrative costs, have been disadvantageously high.

The need for battery charging capability has added a further dimension to the problem of designing docking stations which combine user-desired functionality and manufacturer-desired low cost, versatility, and compatibility.

SUMMARY OF THE INVENTION

The invention may be broadly described as an apparatus for coupling one of a set of pieces of equipment, functionally equivalent but different in configuration, to a standard interface. The invention has particular applicability to docking stations for coupling different portable computers, such as different models from a manufacturer's line of portable computers, to standard peripheral devices.

There is provided a docking station apparatus having two modules. The first module is a standard module for interfacing with the peripheral devices and with external power, such as AC power. The second module is selected from a set of modules which correspond with, and are designed for compatibility with, various different portable computers. The selected second module is specific to the particular model of portable computer which is to be used.

The first and second modules couple with each other to produce a docking station. The second module is preferably simple and easy to manufacture, with little or no assembly. This may be achieved by designing the second module to align the portable computer directly with the interface on the first module.

In accordance with the present invention, the docking station apparatus also has a battery charger specific for the type of battery which the corresponding portable computer requires. In particular, a standard charging power coupling is provided on the first module.

On each respective one of the second modules, there is a receptacle, specific to the battery pack employed by the corresponding portable computer. The receptacle is at a location on the second module which suitably aligns with the battery charger coupling of the first module. The receptacle in the second module may include suitable electrical connections to facilitate battery charging from the first module's charger coupling, but preferably is merely a structure in the second module for securely holding the battery pack as it charges from the standard charging power coupling.

Thus, the combination of the standard first module and the correct specific second module accommodates the battery type required for the personal computer. A user is able to recharge an extra battery pack while using the computer, docked to the docking station and coupled to various peripheral devices. The user will be able to take advantage of the time he/she spends using the computer, to recharge the battery pack.

BRIEF DESCRIPTION OF THE DRAWINGS

FIGS. 2 and 3 are perspective drawings of two different portable-electronic-device-specific docking modules, showing two possible locations for battery receptacles.

DETAILED DESCRIPTION OF THE PREFERRED EMBODIMENTS

SCOPE OF THE INVENTION

Figure 1:
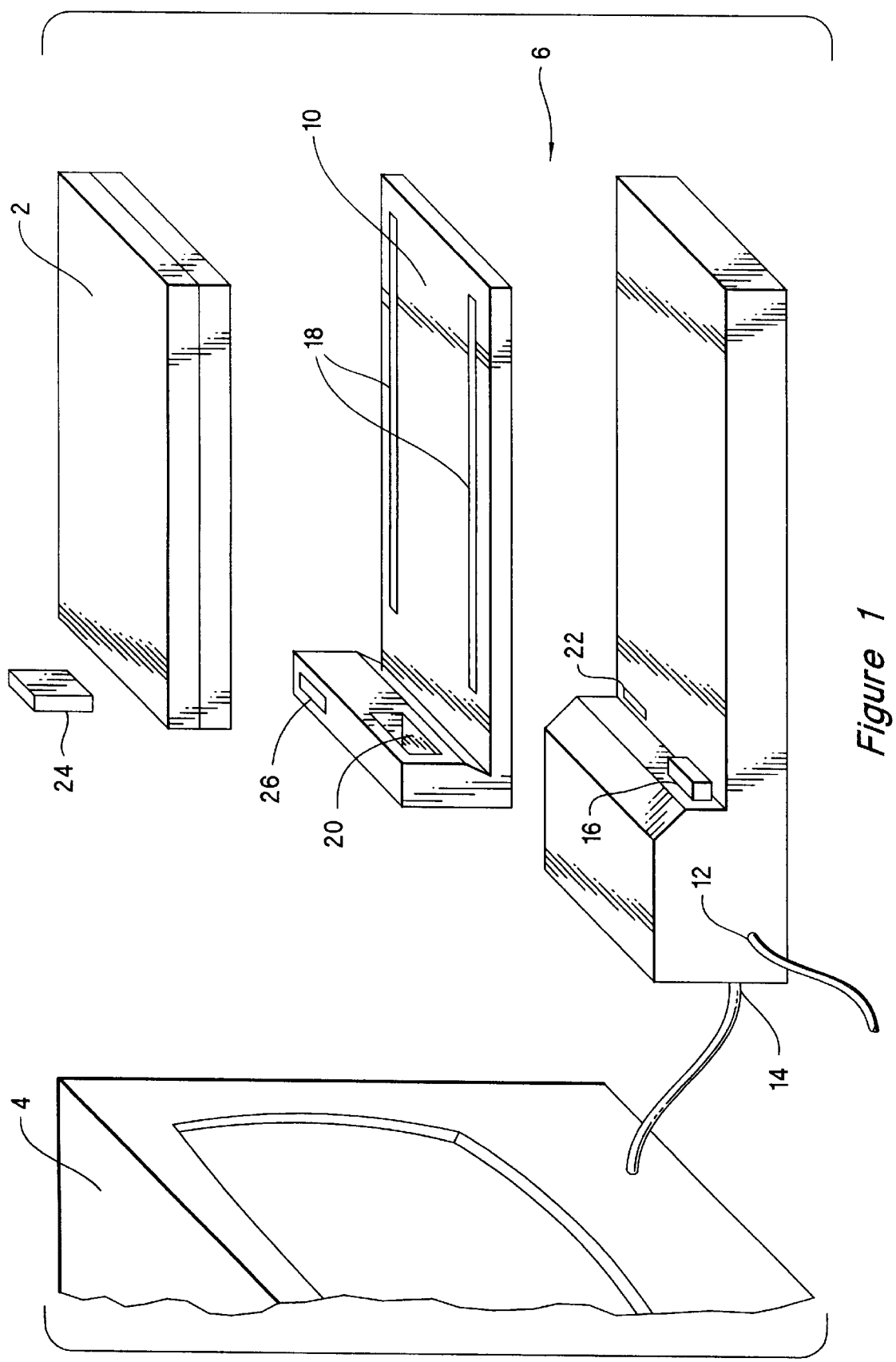
FIG. 1 is an exploded perspective view showing a docking apparatus according to the invention, along with a portable electronic device and a power storage module for docking thereto.

In the discussion which follows, the invention will be described in terms of a preferred class of embodiments involving portable computers and peripheral devices which are essentially stationary, in that they remain set up at a user's work station, even though the user sometimes disengages the portable computer and transports it for use elsewhere. In these embodiments, the invention is contained within a docking station, which also remains at the user's work station. The user finds that docking and undocking the personal computer to and from the docking station is more easy and convenient than directly connecting the peripherals would be.

However, it will be understood that the invention is more widely applicable in numerous situations where portable and stationary electronic equipment are used together. For instance, a laboratory test facility may include a portable sensor which collects data and is then coupled to a test and analysis facility which communicates with the sensor to receive and analyze the data. Also, portable communications equipment, such as radiotelephones or cordless cellular phones may couple to base stations through docking equipment embodying the invention. Additional applications for the invention, and environments in which the invention may be used, will be understood by persons skilled in the respective electronic equipment arts, based on this disclosure.

A RELATED INVENTION

The present invention is an enhancement of the invention described and claimed in co-pending, co-assigned U.S. patent application Ser. No. 09/179,241, Helot et al., "Mechanism for insertion and removal of adapter trays of a docking station," which is hereby incorporated by reference.

For the manufacturer, a new model of personal computer does not require a whole new docking station. Rather, only a new specific module, compatible with the standard module, must be developed. Accordingly, the manufacturer's inventory and model-tracking burden is reduced. Also, if a user upgrades his/her personal computer, then he/she can still use the old standard docking module, and only needs the specific module which goes with the new model of portable computer. Accordingly, the user's costs are reduced.

THE PRESENT INVENTION

In accordance with the invention, the need for different and specialized battery chargers and the need for likewise different and specialized docking stations are both satisfied.

A docking station according to the invention includes a standard first module which includes standard components, such as standard peripheral device communication ports, an AC power coupling, etc. Accordingly, the docking station of the invention facilitates coupling a piece of equipment, such as a portable computer, with the peripheral device or devices bearing the ports. It will generally be the case that the peripheral devices have standard interfaces. Therefore, it may be more broadly said that the docking station facilitates coupling to a standard configuration interface.

In accordance with the invention, the first module includes a battery charging interface for accommodating the compatible notebook computer's battery pack. The battery interface includes an electrical coupling structure for providing recharging power to the battery pack.

Each docking station also includes a portable-computer-specific, custom second module which is specific to one particular model of personal computer. Each such module is pre-designed to support the specific physical dimensions and electrical characteristics of that particular notebook. In accordance with the present invention, each of the second modules also has a battery pack receptacle for holding the battery pack so that it can be charged. Preferably, the user installs the extra battery pack at the same time he/she docks the computer. While the user is using the docked computer, the battery pack recharges. Then, the user simply detaches the recharged battery pack at the end of the computing session.

All the elements required for an external battery adapter, power and a physical support structure, are present in conventional docking stations. By making the power and a physical support available for charging a battery pack, a docking station according to the invention provides the customer with enhanced functionality and convenience. Preferably, that enhanced product is already customized to the user's particular need, in that a computer-specific notebook tray adapter is provided. Also providing a computer-specific battery charger adds further value, and eases upgrading.

Preferably, the second modules are designed and manufactured as a single part. For instance, each second module is preferably made of molded plastic. This keeps the cost and manufacturing complexity for the second modules advantageously low. Preferably, the battery receptacle of the present invention is embodied as part of the one-part design for the second modules, so the low cost and easy manufacturability are preserved.

FIRST EMBODIMENT—FIG. 1

FIG. 1 is an exploded perspective view of a docking station according to the invention, and its operating environment. A piece of portable electronic equipment is shown as a portable computer 2, and a piece of stationary electronic equipment is shown as a computer peripheral 4, specifically a CRT monitor. The task at hand is to interface the computer 2 with the monitor 4 for "desktop replacement" operation.

To provide this interfacing, there is shown a docking station 6, which includes a first (standard) module 8 and a second (portable-equipment-specific) module 10.

The first module 8 includes a standard power input 12, such as an AC input or an input which is coupled to standard AC power through a power converter which provides DC power by rectifying AC power. The first module 8 also includes standard peripheral interfaces, for instance a CRT monitor interface 14.

The first module 8 also includes a module interface 16, which is shown in simplified schematic form. In practical implementations, the module interface 16 includes interfaces, preferably as per known interface standards, for coupling to peripheral interfaces such as the monitor interface 14, and to power.

The second module 10 is specific to, and physically configured for, a particular model of portable computer, that is, the computer 2. Numerous physical implementations are possible, at the designer's requirements and discretion. A preferred implementation is shown as a tray, flat and substantially similar in length and width to the computer 2. Guide members such as rails 18 are provided for guiding the computer 2 into position on the second module 10.

As the user sets up the docking station for operation, he/she will interconnect the module interface of the second module 10 with the module interface 16. Once this is done, the user normally will not disengage the modules 10 and 8 from each other. Only when the user obtains a new computer and a new portable-electronic-device-specific module will he/she disengage the second module 10 to replace it.

The second module 10 is configured such that, when it is coupled to the first module 8 and also to the computer 2, the peripheral interface of the computer 2 (not visible in the perspective view of FIG. 1) engages an interface provided by the docking apparatus.

It is possible to configure the second module 10 with another module interface (which is not shown in the perspective view of FIG. 1, but which is compatible with the module interface 16) which couples to the interface 16 and to the interface of the computer 2. Any electrical interfaces on the second module 10 itself is specific to the computer 2, and will vary from one of the second modules 10 to another.

However, the preferred embodiments of the docking apparatus of the invention make the second module 10 as simple and inexpensive to manufacture as possible. In such preferred embodiments the second module 10 holds the computer 2 in a position such that the interface of the computer 2 directly engages, and directly interfaces electrically with, the interface 16 of the first module 8. That is, the second module 10 is preferably "pass-through", in that it does not include an electrical interface with the computer 2.

The example shown in FIG. 1 is simplified for ease of comprehension. An aperture 20 on the second module 10 is aligned with the interface 16, to allow access to the interface 16 when the second module 10 is coupled to the first module 8. When the computer 2 is docked, its interface (again, not shown in the perspective view of FIG. 1), the interface of the computer 2 couples with the interface 16. As a result, power and the peripheral device 4 are coupled to the computer 2.

Also shown in FIG. 1 is a power storage module, such as a spare battery pack 24. In accordance with the invention, the docking station apparatus includes a spare battery charger, so that a user who has both the portable computer 2 and the spare battery pack 24 for it can recharge the spare battery pack 24 while using the docked computer 2. It is convenient for the user to do so, because he/she is present for an extended period of time, while using the docked computer.

As stated above, power, provided to the first docking module 8 through the power interface 12, is provided for coupling power to the computer 2, to operate the computer 2 and to recharge its on-board battery. Likewise, the power is also available for charging the spare battery pack 24.

In accordance with the invention, a power interface coupling 22 is provided on the first module 8. The second module 10 includes a receptacle 26 for receiving the battery pack 24. Power is provided for recharging the battery pack 24 while it is inserted in the receptacle 26. Thus, the user can simultaneously (i) operate the computer 2, (ii) recharge the battery inside the computer 2, in accordance with the capabilities of the computer 2, and (iii) separately recharge the spare battery pack 24.

The battery pack receptacle 26 is physically configured to receive the battery pack 24 and hold it steadily in place. The shape of the receptacle 26 conforms to the shape of the battery pack 24. The receptacle may be configured simply as an aperture in the overall shape of the second module 10, essentially as shown. Such an aperture is easily made in a flat surface of the second module, in a "cookie cutter" manner. Alternatively, the receptacle 26 can have a distinctive shape, which conspicuously projects outward from the rest of the second module 10, to serve as a "holster" for receiving the battery pack 24.

The receptacle 26 preferably is formed from the same material as the rest of the second module 10, for instance molded plastic. Accordingly, the simplicity and low cost of the manufacturing process is received. In the holster configuration, the receptacle 26 may alternatively be made as a separate part, which couples mechanically with the rest of the second module 10.

It is also preferred that the receptacle 26 be positioned on the second module 10 to guide the battery pack 24, directly to engage the power interface coupling 22. As an alternative, however, the second module 10 can include electrical contacts, couplings, etc., which interface between the battery pack 24 and the power interface coupling 22. This latter alternative, however, would add to the manufacturing cost and complexity of the second module 10, and is therefore not regarded as a preferred embodiment.

Figure 4:
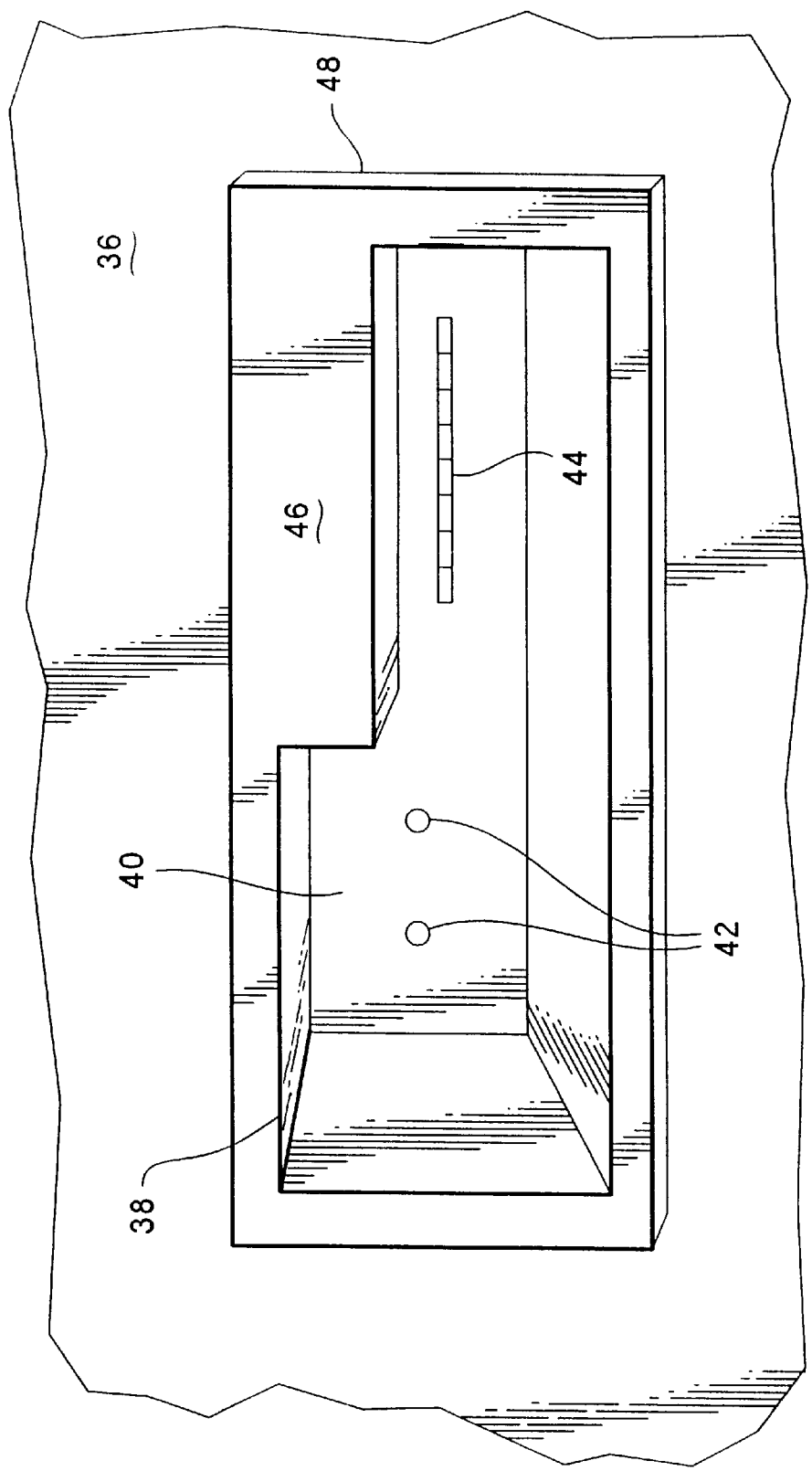
FIG. 4 is a more detailed perspective view showing a glimpse of the interior of a battery receptacle according to the invention.

OTHER EMBODIMENTS—FIGS. 2, 3, and 4

The physical configuration of various second modules 10 will depend on the particular computers they are to accommodate. In general, the receptacle 26 may be positioned anywhere that the user may conveniently reach, to insert the battery pack 24. Generally, a user-accessible surface, such as the front, top, or side, will be a suitable location for the receptacle 26.

FIGS. 2 and 3 show two such possible arrangements, for modules 10 that are configured as trays for holding their respective computers. FIGS. 2 and 3 are simplified perspective views, from above.

In FIG. 2, there is a user-accessible surface 28 on the upper side of the second module 10, which will not be covered by the computer 2 when it is installed. In this surface 28 is a receptacle 30 for the battery pack 24.

In FIG. 3, a user-accessible surface 32, having a battery receptacle 34, is provided on the side of the second module 10. During operation with the computer 2 installed, the user will be able to insert or remove the battery pack 24 with one hand.

FIG. 4 is a close-up perspective view of a battery receptacle, looking inward. A cutaway portion of a user-accessible surface 36 is shown. An aperture 38, for accommodating the battery pack, is preferably shaped substantially in conformity with the battery pack itself. For instance, the aperture 38 is shown as being L-shaped.

When the battery pack is inserted into the receptacle, the battery pack meets an interior surface 40. The interior surface 40 bears electrical contacts 42 for engaging electrical contacts on the battery pack, and for delivering charging power. The interior surface 40 also, optionally, bears control signal contacts 44, whose purpose is discussed below.

In one preferred embodiment of the invention, the battery receptacle is formed as part of the second docking module. As described in the co-pending, co-assigned 09/179,241 patent application, the second docking module is preferably implemented as a tray, and made out of molded plastic. In accordance with the present invention, the battery receptacle is molded into the plastic tray. Thus, the benefits of inexpensive, easy manufacture apply to the present invention, including the battery receptacle, as well as to the basic custom tray invention of the 09/179,241 patent application.

In another preferred embodiment, the receptacle is implemented as a removable and replaceable holster 46. The holster 46 serves as an adapter portion, and is inserted into a generic slot in the portable-equipment-specific module of the docking station. Accordingly, if a holster is damaged by wear and tear, battery leakage, etc., a new holster can be put in easily.

In the illustrated embodiment, a front surface 48 of the holster 46 lies substantially flush with the user-accessible surface 36.

Also, different holsters may serve as interchangeable adapters for different battery packs. Finally, when a new portable-equipment-specific module (similar to the second module 10, but designed for the different computer) is installed for use with a new notebook computer having a new type of battery, the new battery holster comes with the new portable-equipment-specific module. Again, it is preferable that the battery holster and the equipment-specific module be made as one unit, for instance, as a molded plastic tray having a battery receptacle.

The battery holster would include a set of special contacts (e.g., the contacts 42 and 44) arranged for a particular or several types of batteries. These are wired to a generic set of contacts in the dock to support various types of adapters. Circuitry would be included in this holster to allow future customization such as charge current limiting or heat sensors.

In yet another embodiment, the holster 46 may be configured to hold more than one battery pack. Also, the second module 10 may be configured to hold more than one holster such as the holster 46. In either case, simultaneous multiple-battery charging is facilitated. The different battery receptacles may be located on different user-accessible surfaces of the second module 10. Indeed, the only limitation on the number of batteries that can be charged simultaneously is the limitation which the overall size of the docking station places on the number of battery receptacles that can practicably be designed into it.

ELECTRICAL CIRCUITRY—FIG. 5

Figure 5:
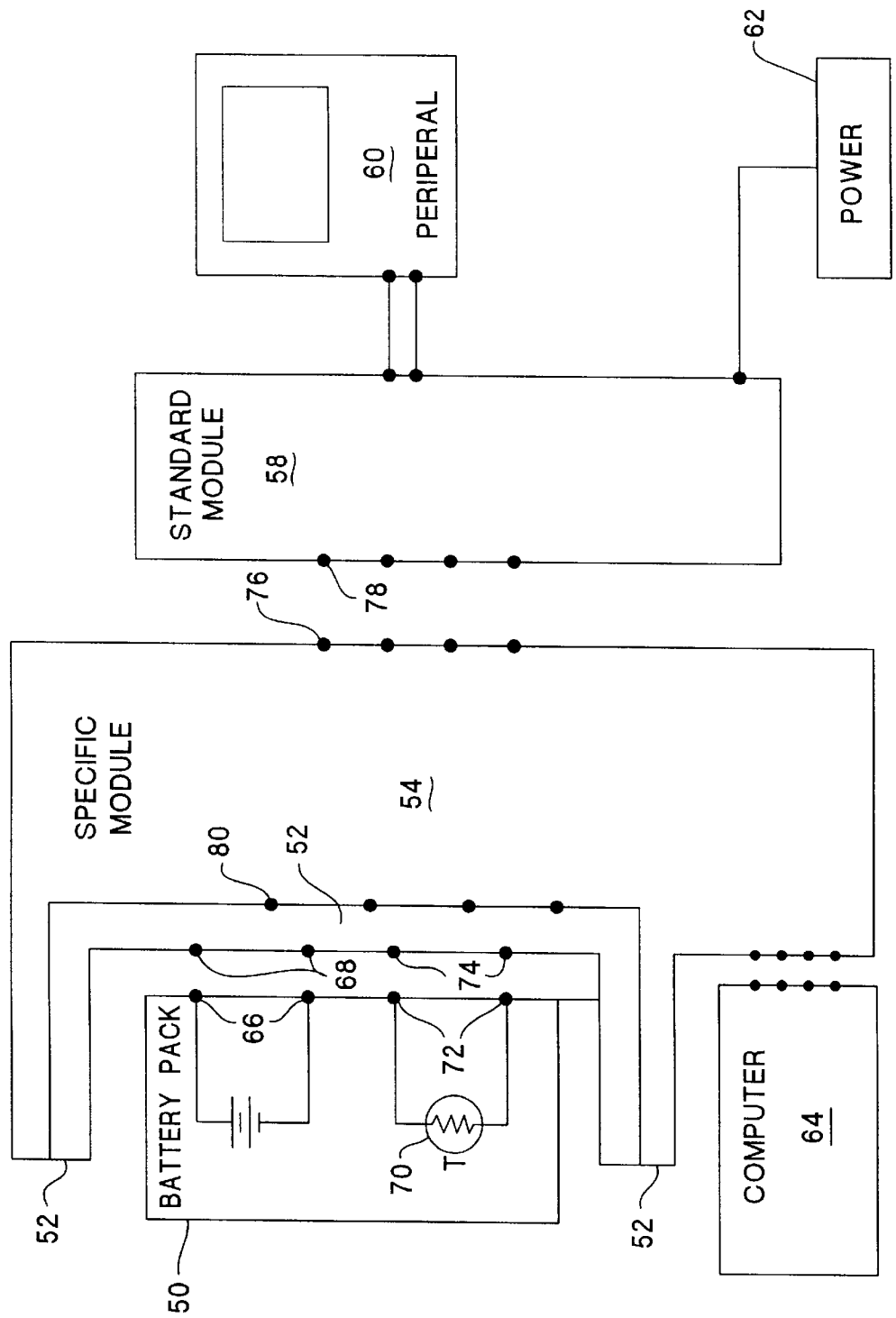
FIG. 5 is a high-level schematic diagram of preferred circuitry, within the docking system of the invention, for providing power to the power storage module.

FIG. 5 is a schematic diagram showing electrical interconnections of modules such as those discussed above, and representing the modules themselves in block diagram form.

Optionally, there may be additional contacts for ancillary purposes, such as for driving LEDs in the battery pack to indicate that charging is in progress.

A power storage module (e.g., battery pack) 50 is inserted into a battery-customized holster 52 of a portable-electronic-equipment-specific module 54. The module 54 is coupled to a standard module 58 which, in tern, is coupled to a piece of stationary electronic equipment (e.g., a peripheral device) 60 and to a power source 62. Finally, a piece of portable electronic equipment 64 (e.g., a portable computer) is coupled to the module 54.

The battery pack 50 has power contacts 66 which engage power contacts 68 of the holster 52. The power contacts 68 are comparable to the contacts 42 of FIG. 4. The battery pack 50 also includes additional circuitry for providing control functions. This additional circuitry may include current limiting, etc., or, as shown, a temperature sensor 70. Temperature sensor contacts 72 in the battery pack 50 engage contacts 74 in the holster 52. The contacts 74 are comparable to the contacts 44 of FIG. 4, and support these or other control-type functions.

In addition to the contacts 72 and 74, additional contacts are provided as needed for other circuitry, functionality, sensing, controls, etc.

The contacts 66, 68, 72, and 74 are shown schematically as dots, and their functionality will be understood from the discussion given above in connection with the other FIGs. Where components are shown in an exploded form, such as the modules 54 and 58, contacts which engage each other are aligned with each other, for instance, contacts 76 and 78 of the modules 54 and 58. Where components are shown as engaged, such as the holster 52 and the module 54, single dots, for instance a dot 80, represents contacts on the two modules which are engaged with each other.

It will be understood that contacts such as 76 will be the same for all versions of the module 54, so that they all interface properly with the standard module 58. Contacts such as 68 and 74 on the holster 52 will be suitable for engaging the corresponding battery pack. Circuitry or electrical connections within the specific module 54 and/or the holster 52 will couple appropriate contacts to each other.

In yet another embodiment of the invention, the battery pack contacts will be associated with a mechanical repositioning structure, so that the user can change the locations of the contacts to accommodate a battery pack also having different contacts.

In still another embodiment, the battery pack contacts may be electrically configurable. For instance, the power interface may include a set of contacts, only a subset of which are used for any given battery pack. Under user control, such as through an application program on the computer or through a user-operable control on the first module, power is enabled to the contacts to be used, and disabled to the rest of the contacts.

Depending on the wide variety of batteries available for use, these contacts, and their interconnections, will vary in ways that will be understood by a person skilled in the art, based on this disclosure.

ADDITIONAL EMBODIMENT—FIGS. 6, 7, 8, AND 9

The standard first docking module may optionally contain several different battery recharge couplings, in different configurations located over different parts of the first module.

Figure 9:
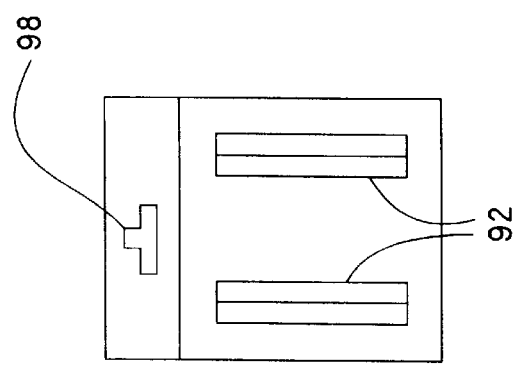
FIGS. 6, 7, 8, and 9 are simplified top views of docking modules according to another embodiment of the invention.
Figure 8:
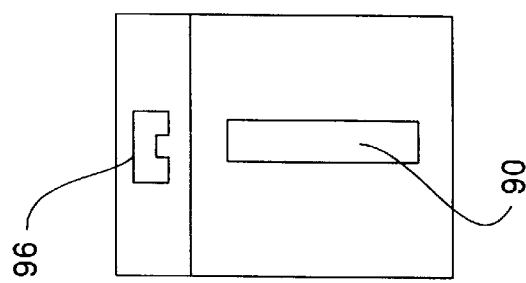
Figure 7:
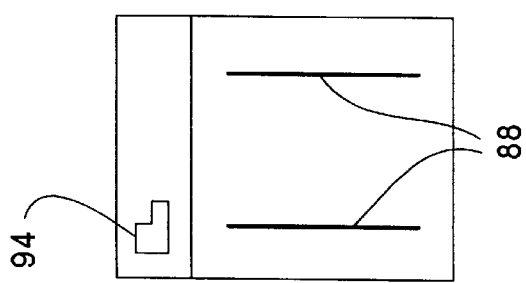
Figure 6:
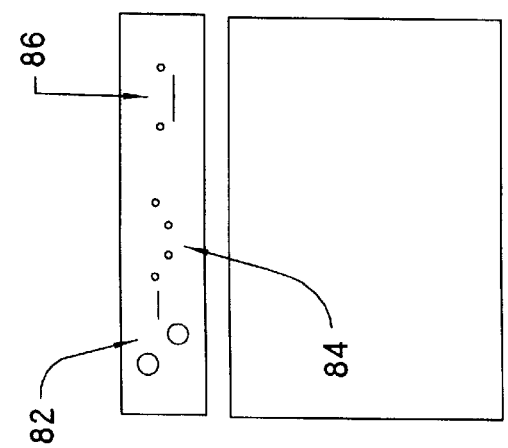

An example of such an arrangement includes a first module, shown in simplified top view in FIG. 6, and three different second modules (FIGS. 7, 8, and 9). Three different battery charge couplings 82, 84, and 86 are shown at various positions on the top surface of the illustrated first module. While the couplings 82, 84, and 86 are shown only in simplified, schematic form, it will be understood that they represent different couplings for battery packs configured correspondingly, and which provide suitable charging voltages, currents, etc., for those corresponding types of battery packs.

The different battery charge couplings are shown on parts of the first module which are not covered by a docked computer, and which therefore are accessible to a user who wants to recharge a battery pack.

FIGS. 7, 8, and 9 show three different second modules for accommodating three different models of portable computers. As before, the second modules are in a preferred tray configuration. Guides for aligning computers for docking are shown in simplified form as rails 88, 90, and 92.

In accordance with the invention, the three second modules each have a battery pack receptacle. The receptacles are respectively designated 94, 96, and 98. The receptacles are shown in simplified schematic form as having different shapes. This is representative of the different configurations the receptacles will have, for receiving differently configured battery packs.

If the three trays of FIGS. 7, 8, and 9 are visualized as superimposed over the first module of FIG. 6, it will be seen that the receptacles 94, 96, and 98 are positioned over the battery charge couplings 82, 84, and 86, respectively. In all cases, the other two battery charge couplings are covered up. In accordance with this embodiment of the invention, the receptacles of the three trays facilitate engaging the different battery packs with their respective, appropriate battery charge couplings. Thus, a given one of the second modules, which corresponds with a model of portable computer that requires a particular one of the recharge coupling configurations, will have its battery receptacle positioned adjacent to that recharge coupling. The other recharge couplings, which will not be used, are harmlessly covered up by the second module.

FURTHER EMBODIMENTS OF THE INVENTION

Additional embodiments of the invention will suggest themselves to persons skilled in the art, based on the disclosure given above. For instance, the following additional embodiments:

It is also possible to have the battery receptacle, configured as a battery holster, as a component altogether separate from the second docking module. The first module will then be designed to provide suitable recharge coupling access for the holster, even if one of the second modules is installed, and even if a computer is docked. Also, a dedicated first docking module may be used with one or more battery holsters alone, without a second docking module or a docked computer. This latter arrangement would be useful for recharging multiple battery packs overnight.

Charging control features may be made available to the user. For instance, an on-board CPU or hard-wired control lines may be included on the first docking module. A software application program, running on the computer and controllable by the user, gives the user facility to control the amount of charging, a charging time duration, or sequential charging for multiple installed battery packs. Also, the application program can provide an alarm to the user when the battery pack has fully recharged, reached to a predetermined degree, or recharged for a predetermined length of time. Through the use of the control lines or the first module's on-board CPU, the application program directs the first module to recharge the battery pack as per the user's wishes.

A security feature can also be provided. A mechanical lock, similar to those used for the docked computers, secures the battery pack in place until the user, suitably authorized, releases the battery pack by computer control.

What is claimed is:

1. A docking apparatus, for use with a piece of equipment selected from a set of pieces of equipment having different physical configurations, each of the pieces of equipment having a respective removable and rechargeable power storage module, the power storage modules of the pieces of equipment having different configurations, for coupling the respective piece of equipment to an equipment interface having a standard physical configuration, the apparatus comprising:

a standard first module including the equipment interface, the first module having a power output interface for coupling with the power storage modules and for providing power to charge the power storage modules; and a respective second module, selected from a set of second modules which correspond with respective ones of the pieces of equipment, each of the second modules being compatible with the standard first module for coupling therewith, the respective second module being compatible with the respective piece of equipment, the second module including a power storage module receptacle having a configuration which is compatible with the configuration of the power storage module, for receiving the power storage module and coupling the power storage module with the power output interface for recharging.

2. A docking apparatus as recited in claim 1, wherein:
the set of pieces of equipment includes a set of different models of portable computers; and
the interface having a standard physical configuration includes an interface of a computer peripheral device.

3. A docking apparatus as recited in claim 1, wherein:
the second modules are configured as trays for holding the pieces of equipment when docked;
each of the second modules includes a region which is accessible to a user when the respective piece of equipment is docked;
the power output interface is located on the first module at a position which, when one of the second modules is coupled to the first module, is adjacent to the user accessible regions of the coupled second module; and
the power storage module receptacle is located on the user accessible region of each respective second module.

4. A docking apparatus as recited in claim 1, wherein:
the respective second module includes a substantially flat surface;
the receptacle is an aperture, within the substantially flat surface, of a shape substantially identical to a shape of the power storage module for accommodating the power storage module; and
the power output interface is positioned within the receptacle for engaging the power storage module when the power storage module is inserted into the aperture.

5. A docking apparatus as recited in claim 1, wherein the respective second module includes a holster having a receptacle shaped for accommodating the power storage module, the power output interface being positioned within the receptacle for engaging the power storage module when the power storage module is inserted into the holster.

6. A docking apparatus as recited in claim 1, wherein the power output interface includes a control contact which supports a control-type function for controlling charging of the respective removable and rechargeable power storage module.

7. A docking apparatus as recited in claim 1, wherein:
the first module includes a plurality of different power output interfaces at different locations thereon; and
each respective one of the second modules, for use with a piece of equipment whose power storage module corresponds with a respective one of the power output interfaces, has its receptacle located at a position which, when the second module is coupled with the first module, is adjacent to the respective power output interface.

8. A docking apparatus as recited in claim 1, wherein:
the first module includes a region which is accessible to a user when the respective piece of equipment is docked;
the first module further includes a power output interface on the accessible region; and
the apparatus further comprises a separate power storage module receptacle which includes means for coupling with the first module at a location adjacent to the power output interface on the accessible region.

9. A docking apparatus as recited in claim 1, further comprising a security lock for holding the power storage module in place, inside the receptacle, while charging is taking place.

10. A docking station for connecting a first piece of equipment having a removable and rechargeable power storage module to an equipment interface, the docking station comprising:

a base module comprising:
the equipment interface, and
a power output interface for providing power to charge the power storage module; and,
a first interchangeable module connectable to the base module, the first interchangeable module corresponding to the first piece of equipment, the first interchangeable module comprising:
a power storage module receptacle for receiving the power storage module and electrically coupling the power storage module to the power output interface of the base module for recharging;
wherein when a different piece of equipment with a different configuration is to be connected to the equipment interface, another interchangeable module corresponding to the different equipment interface can be connected to the base module instead of the first interchangeable module.

11. A docking station as in claim 10, wherein the first piece of equipment is a first portable computer and the different piece of equipment is a second portable computer that is a different model than the first portable computer.

12. A docking station as in claim 11 wherein the equipment interface includes an interface to a computer peripheral device.

13. A docking station as in claim 10, wherein the first interchangeable module is configured as a tray for holding the first piece of equipment when the first piece of equipment is docked to the docking station.

14. A docking station as in claim 10, wherein:
the respective first interchangeable module includes a substantially flat surface;
the power storage module receptacle is an aperture within the substantially flat surface; and
when the first interchangeable module is connected to the base module, the power output interface is positioned within the receptacle for engaging the power storage module when the power storage module is inserted into the aperture.

15. A docking station as in claim 10, wherein:
the first interchangeable module includes a holster having a receptacle shaped for accommodating the power storage module; and,
when the first interchangeable module is connected to the base module, the power output interface is positioned within the receptacle for engaging the power storage module when the power storage module is inserted into the holster.

16. A docking station as in claim 10, wherein the power output interface includes a control contact which supports a control-type function for controlling charging of the removable and rechargeable power storage module.

17. A docking station as in claim 10, wherein the power output interface includes a set of contacts, only a subset of which is for use with the removable and rechargeable power storage module, another subset of the set of contacts being for use with a different type of removable and rechargeable power storage module.

18. A docking station as in claim 10, wherein the first module additionally includes an additional power output interface, the additional power output interface being for use when the different piece of equipment with the different configuration is connected to the equipment interface.

19. A docking station as in claim 10, wherein the base module additionally includes a second power output interface which is accessible to a user when the first interchangeable module is connected to the base module and the first piece of equipment is docked to the docking station, the second power output interface being for connection to a separate power storage module.

20. A docking station as in claim 10, further comprising a security lock for holding the power storage module in place, inside the power storage module receptacle, while charging is taking place.

* * * * *